United States Patent
Thompson, IV

(10) Patent No.: US 12,000,478 B1
(45) Date of Patent: Jun. 4, 2024

(54) METHOD FOR SYNCHRONIZED FOUR WHEEL DRIVE LOW RANGE SHIFTS WITH VEHICLE IN MOTION

(71) Applicant: FCA US LLC, Auburn Hills, MI (US)

(72) Inventor: Frank C Thompson, IV, Livonia, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/362,285

(22) Filed: Jul. 31, 2023

(51) Int. Cl.
  *F16H 61/32* (2006.01)
  *F16H 61/664* (2006.01)

(52) U.S. Cl.
  CPC ......... *F16H 61/32* (2013.01); *F16H 61/6645* (2013.01); *F16H 2061/323* (2013.01)

(58) Field of Classification Search
  CPC ...... F16H 61/32; F16H 61/6645; F16H 61/04; F16H 61/0403; F16H 2061/323; B60W 10/119; B60W 10/14; B60W 10/16
  See application file for complete search history.

(56) References Cited

U.S. PATENT DOCUMENTS

| | | | |
|---|---|---|---|
| 6,629,026 B1 * | 9/2003 | Baraszu | B60K 6/48 701/67 |
| 2007/0151790 A1 * | 7/2007 | Thompson | B60K 23/0808 180/247 |
| 2007/0207896 A1 * | 9/2007 | Radich | F16H 61/0403 477/107 |
| 2013/0331226 A1 * | 12/2013 | Eo | F16H 61/04 476/54 |
| 2017/0291609 A1 * | 10/2017 | Reich | B60W 10/06 |
| 2018/0162398 A1 * | 6/2018 | Grutter | B60W 10/14 |

* cited by examiner

*Primary Examiner* — Edwin A Young

(57) ABSTRACT

A method of controlling a four wheel drive (4WD) low range shift in a vehicle is provided. The vehicle has a powertrain including a transmission that drives a transmission output shaft to provide drive torque to a driveline including a power transfer unit (PTU) that delivers torque to front drive wheels and a rear differential unit (RDU) that delivers torque to rear drive wheels. The PTU and RDU are selectively rotatably coupled to each other through a propeller (prop) shaft. The PTU and the RDU are commanded into a neutral position. A clutch at the RDU is commanded to selectively engage to a degree that communicates a desired amount of torque from the prop shaft to the RDU. A determination is made that an output speed of the transmission output shaft is synchronized to match a speed of the RDU and the RDU is commanded to shift into 4WD low.

10 Claims, 6 Drawing Sheets

METHOD FOR SYNCHRONIZED FOUR WHEEL DRIVE LOW RANGE SHIFTS WITH VEHICLE IN MOTION

FIELD

The present application generally relates to a control strategy to allow synchronized four wheel drive low range shifts while the vehicle is in motion.

BACKGROUND

Some vehicles that are intended to be used in an off-road environment include a four wheel drive (4WD) low range feature. When the vehicle operator selects 4WD low range, the driveline system shifts components in the 4WD system to add an additional gear reduction after the transmission output. The gear ratio of the 4WD low range feature can vary depending on vehicle design. The additional gear reduction multiplies the transmission output torque sent to the drive wheels to provide a higher tractive effort at the drive wheels as well as reduces the rotational speed to allow smoother delivery of torque to the drive wheels. Current 4WD systems do not allow the vehicle to be shifted into or out of 4WD low range while the vehicle is moving greater than very slow speeds. Accordingly, while such 4WD systems do work well for their intended purpose, there exists an opportunity for improvement in the relevant art.

SUMMARY

According to one example aspect of the invention, a method of controlling a four wheel drive (4WD) low range shift in a vehicle is provided. The vehicle has a powertrain including a transmission that drives a transmission output shaft to provide drive torque to a driveline including a power transfer unit (PTU) that delivers torque to front drive wheels and a rear differential unit (RDU) that delivers torque to rear drive wheels. The PTU and RDU are selectively rotatably coupled to each other through a propeller (prop) shaft. The PTU and the RDU are commanded into a neutral position based on a determination that a 4WD low range shift request has been made. A clutch at the RDU is commanded to selectively engage to a degree that communicates a desired amount of torque from the prop shaft to the RDU. A determination is made that an output speed of the transmission output shaft is synchronized to match a speed of the RDU. A first speed of the prop shaft is determined. The RDU is commanded to shift into 4WD low based on a determination that the prop shaft first speed satisfies a desired first speed. The clutch at the RDU is commanded to open. A determination is made that the output speed of the transmission output shaft is synchronized to match a speed of the PTU. The second speed of the prop shaft is determined. The PTU is commanded to shift into 4WD low based on a determination that the prop shaft second speed satisfies a desired second speed.

In some implementations, determining that the output speed of the transmission output shaft is synchronized to match a speed of the RDU includes determining whether the speed of the transmission output shaft is elevated to match a corresponding speed expected at rear drive shafts driven by the RDU based on a gear reduction occurring into the 4WD low range shift.

In some implementations, determining that the output speed of the transmission output shaft is synchronized to match a speed of the PTU includes determining whether the speed of the transmission output shaft is elevated to match a corresponding speed expected at front drive shafts driven by the PTU based on a gear reduction occurring into the 4WD low range shift.

According to another example aspect of the invention determining a first speed of the prop shaft includes receiving a prop shaft first speed signal from a prop shaft speed sensor. Determining a second speed of the prop shaft includes receiving a prop shaft second speed signal from a prop shaft speed sensor.

In some implementations, determining that an output speed of the transmission output shaft is synchronized to match a speed of the RDU includes determining an average axle wheel speed of rear drive axles driven by the RDU. A low range gear ratio provided by the RDU is determined. A product of the average axle wheel speed and the low range gear ratio is calculated. The product and the transmission output shaft speed are compared.

In some implementations, determining the average axle wheel speed of the rear drive axles includes receiving a first wheel speed from a first rear drive wheel. A second wheel speed is received from a second rear drive wheel. The first and second wheel speeds are averaged.

In some implementations, determining that an output speed of the transmission output shaft is synchronized to match a speed of the PTU includes determining an average axle wheel speed of front drive axles driven by the PTU. A low range gear ratio provided by the PTU is determined. A product of the average axle wheel speed and the low range gear ratio is calculated. The product and the transmission output shaft speed are compared.

In some implementations, determining the average axle wheel speed of the front drive axles includes receiving a first wheel speed from a first front drive wheel. A second wheel speed is received from a second front drive wheel. The first and second wheel speeds are averaged.

In other implementations, the low gear ratio is 2.92.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, in a conventional power split hybrid transmission a controller utilizes a method of unsynchronous shifting of a powertrain disconnect device such as a transfer-case gearbox. In this configuration, the output speed of the transmission is left in an uncontrolled state. In doing so, a driveline shift (such as between 4WD Low and 4WD High), depending on the differential speed at which the shift is executed, can result in a rough or bumpy shift felt by the vehicle operator. State of the art powertrain controls typically control transmission output torque to a controlled zero state, rather than controlling the transmission output shaft speed when the powertrain is open in a power split hybrid transmission. In a vehicle at standstill, utilizing existing solutions, the splines of a low range gear box can be blocked and an engagement into a different gear is not possible. Further, it is also not possible to do synchronized shifts for low range gear boxes while the vehicle is moving. Contrary to conventional gearboxes with a torque converter, there will not be some small residual torque transferred via the oil in the gearbox even in neutral that will rotate the entry side of a low range gear box. That movement, in a conventional gearbox having a torque convertor, would be sufficient to enable engagement of the clutches in the gearbox. These unsynchronized shifts can limit the maximum vehicle speed at which a change of gear is possible and is still perceivable to the vehicle driver.

Prior art control methods are capable of controlling the speed of the internal combustion engine and maintain the high voltage battery state of charge without affecting the wheel torque. Such methods rely on the powertrain being connected to the wheels. Such systems cannot handle a second degree of freedom for the speed in the powertrain. If the powertrain is disconnected from the wheels, a second component besides the engine speed, the transmission output shaft, needs to be controlled.

The present disclosure provides a controller and related algorithm that reacts when the power split hybrid powertrain is in an open state (disconnected from the drive wheels), where the sources of drive torque (internal combustion engine and electric motors) are not connected to the wheels any more. The controller and related method controls the speed of the transmission output shaft safely to provide a smooth shift without generating torque on the drive wheels.

The present disclosure also provides a method of controlling a 4WD system for shifting into a 4WD low range while the vehicle is in motion. The method is disclosed for use on a transverse powertrain including a power transfer unit (PTU) and a rear differential unit (RDU) more fully described herein and shown at FIGS. 5 and 6.

Figure 1:
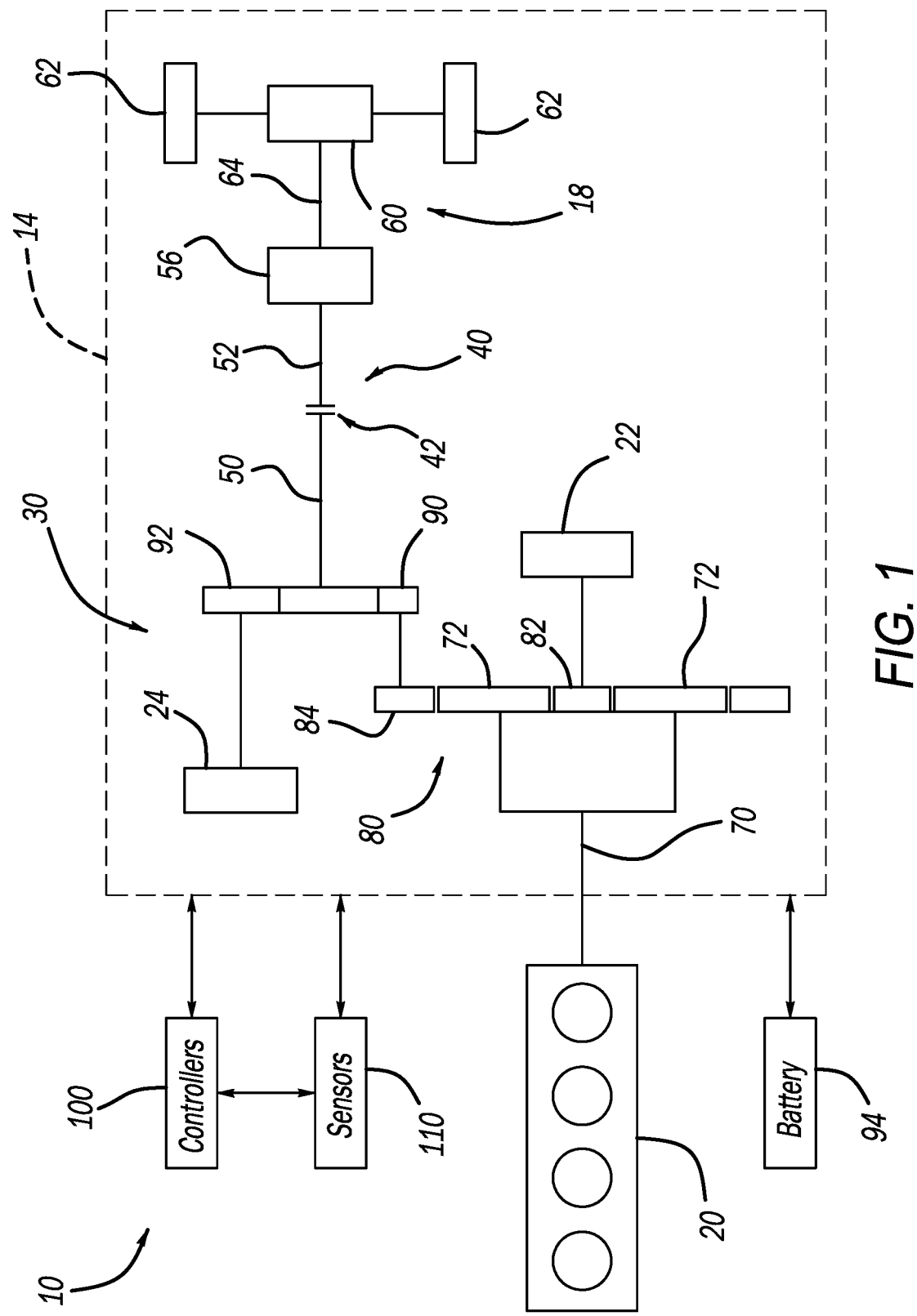
FIG. 1 is a functional block diagram of a vehicle incorporating a power split hybrid transmission having a synchronized shift disconnect element according to the principles of the present application.

With initial reference to FIG. 1, a functional block diagram of an example vehicle 10 according to the principles of the present application is illustrated. The vehicle 10 includes a powertrain 14 having a power split hybrid transmission 30 configured to generate and transfer drive torque to a driveline 18 of the vehicle 10 for propulsion. The powertrain 14 generally comprises an internal combustion engine (ICE) 20, a first electric motor 22, and a second electric motor 24. As will be described herein, the power split hybrid transmission 30 further incorporates a disconnect element 40. The disconnect element 40 includes a disconnect clutch 42 positioned between a transmission output shaft 50 and a transfer case input shaft 52 of a transfer case 56. The transfer case 56 in the present example is a two speed transfer case that provides a high and a low 4WD gear ratio at a transfer case output shaft 60. The driveline 18 further includes a differential 60 that receives a rotatable input from the transfer case output shaft 64 and delivers a drive torque to drive wheels 62.

The ICE 20 drives an output shaft 70 that is rotatably coupled to planetary carrier 72 (having planet gears, not shown) of a planetary gear set 80. The planetary gear set 80 further includes a sun gear 82 and a ring gear 84. The sun gear 82 is rotatably fixed to the first electric motor 22. The ring gear 84 is rotatably coupled to a first ratio counter gear 90. A second ratio counter gear 92 is rotatably coupled to the second electric motor 24. The transmission output shaft 50 rotates based on rotatable inputs from the first and second ratio counter gears 90 and 92. The first and second electric motors 22 and 24 are powered by a high voltage battery system 94. The high voltage battery system 94 can be charged during use of the vehicle such as by voltage generation from the powertrain 14 including the ICE 20 and any regenerative braking inputs.

In the power split hybrid transmission 30, the first electric motor 22 is connected to the sun gear 82 of the planetary gear set 80 and used to control the speed of the ICE 20 at the planet carrier 72. Due to the physics of the power split hybrid transmission 30, the second electric motor 24 counter acts the torque created by the first electric motor 22 to achieve a net zero torque at the transmission output shaft 50. As will become appreciated therein, a controller 100 communicates with the powertrain 14 to command the second motor 14 to control the speed of the transmission output shaft 50 based on inputs received by sensors 110

Figure 2:
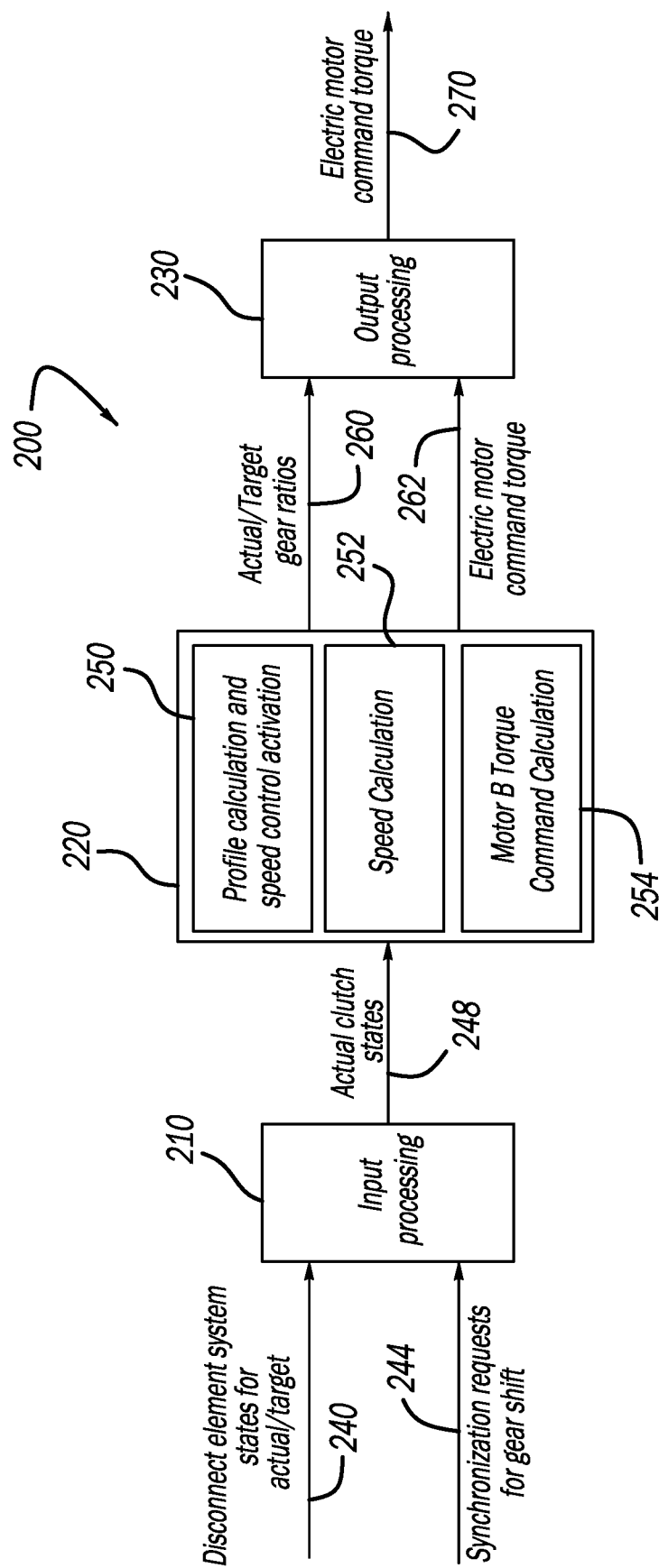
FIG. 2 is a logic flow diagram illustrating various inputs and calculations used in determining an electric motor command torque according to principles of the present application.

With additional reference now to FIG. 2, a logic flow diagram 200 illustrating a control algorithm using various inputs and calculations used by the controller 100 in determining an electric motor command torque sent to the second electric motor 24 will be described according to principles of the present application. The controller 100 generally includes an input processing module 210, a calculation module 220 and an output processing module 230. The input processing module 210 receives various inputs from the sensors 110 including a disconnect element system state signal 240 and a synchronization request for gear shift signal 244. The input processing module 210 outputs an actual clutch state signal 248 to the calculation module 220.

The calculation module 220 generally includes a profile calculation and speed control activation module 250, a speed calculation module 252 and a second electric motor torque command calculation module 254. The profile calculation and speed control activation module 250 calculates a desired speed profile of the second electric motor 24, enables and disables a speed profile depending on system states, calculates a target powertrain gear ratio for the second electric motor 24 and determines a desired state for the internal hybrid control processor (HCP) usage. The speed calculation module 252 calculates an output speed of the transmission output shaft 50 based on target and actual disconnect element 40 status and final drive ratios. The second electric motor torque command calculation module 254 calculates a torque command of the second electric motor 24 based on desired motor speed and motor speed profile for the shift. The calculation module 220 outputs an actual/target gear ratio signal 260 and an electric motor command torque signal 262. The output processing module 230 outputs an electric motor command torque signal 270 based on the actual/target gear ratio signal 260 and an electric motor command torque signal 262.

If the vehicle 10 is moving, the control algorithm 200 targets a transmission output speed profile calculated from the wheel speed and considering all other gear rations between the transmission output shaft 50 and the drive wheels 62 including the final drive ratio. If a low range gear box is used at the transfer case 56, it will include the targeted low range gearbox gear ratio into the calculation. At standstill, the algorithm 200 will target a small positive speed to rotate at a small speed to unblock the splines of the engagement clutch (e.g. at the disconnect element 40). This speed matching allows the low range transfer case to be engaged even at higher vehicle speeds. The target speed profile according to the present disclosure is smooth and ramped. It does not step to the final target.

Figure 3:
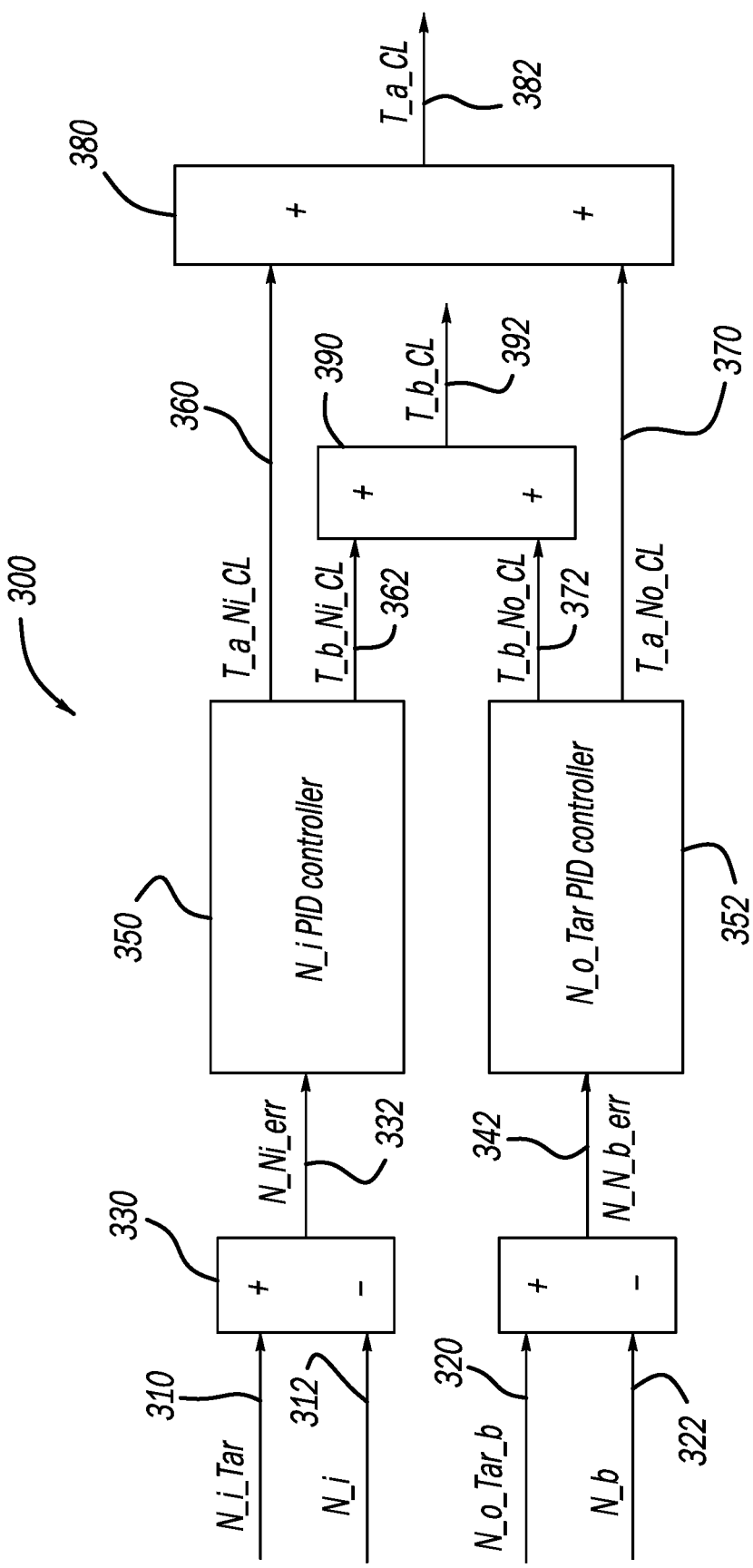
FIG. 3 is an exemplary closed loop control used by the controller in the power split hybrid transmission of FIG. 1.

Turning now to FIG. 3, a closed loop controller torque summation used by the controller 100 is shown and generally identified at reference 300. The closed loop controller torque summation 300 generally receives target engine speed signal 310, an actual engine speed signal 312, a transmission target speed 320, and an actual transmission speed signal 322. The engine speed signal 312 and the transmission speed signals 322 represent an actual measured engine speed and transmission speed (such as at the transmission output shaft 50). A first summation block 330 outputs an engine speed error signal 332 to an engine speed target controller 350. In examples, the controller 350 can be a proportional-integral-derivative (PID) controller. A second summation block 340 outputs a transmission output speed error signal 342 to a transmission output speed target controller 352. The controller 352 can be a PID controller.

The engine speed target controller 350 outputs an engine speed control torque command signal 360 for the first electric motor 22 and an engine speed torque command signal 362 for the second electric motor 24. The transmission output speed target controller 352 outputs a transmission speed control torque command signal 370 for the first electric motor 20 and a transmission speed control torque command signal 372 for the second electric motor 24. A summation block 380 outputs a torque command signal 382 to the first electric motor 20 based on the engine speed control torque command signal 360 and the transmission speed control torque command signal 370. A summation block 390 outputs a torque command signal 392 to the second electric motor 24 based on the engine speed control torque command signal 362 and the transmission speed control torque command signal 372.

Figure 4:
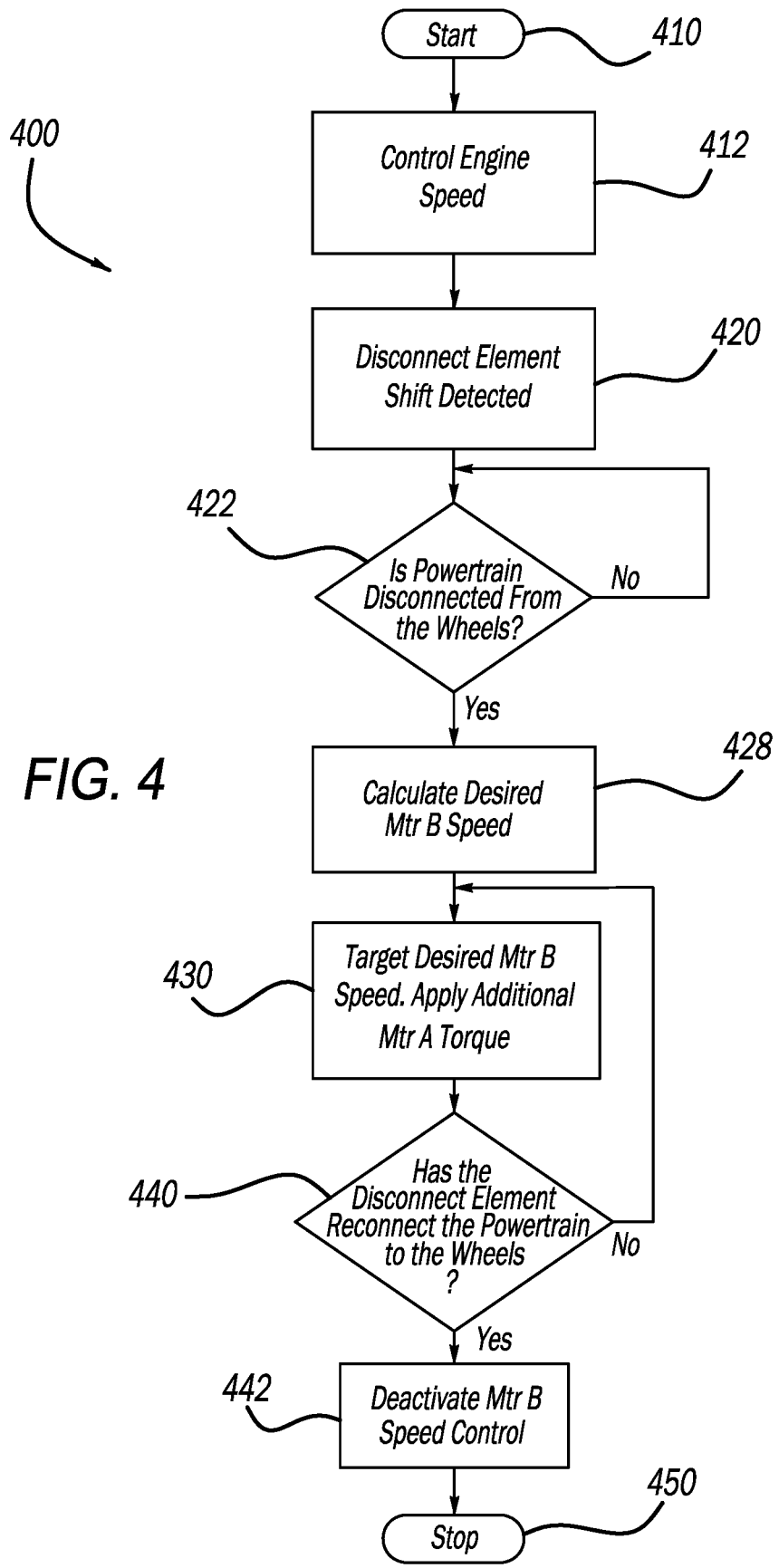
FIG. 4 is an exemplary flow diagram showing steps used to determine and set speeds of the first and second electric motors to achieve a desired transmission output shaft speed during a 4-wheel drive range shift.

With additional reference now to FIG. 4, control method 400 used to determine and set speeds of the first and second electric motors 22, 24 to achieve a desired speed of the transmission output shaft 50 during a 4-wheel drive range shift will be described. The method starts at 410. At 412, the speed of the engine 20 is controlled. In examples, open loop control can command the first and second electric motors 20, 22 depending on commanded engine torque from the vehicle driver and a charge request of the controller 100 to charge the high-voltage battery 94. If the ICE 20 is running, torque from the first and second electric motors 22, 24 are used to control the speed of the ICE 20 in a manner to also have no effective torque at the transmission output shaft 50.

At 420, a disconnect element shift is detected and a target state is changing. At 422, control determines if the powertrain 14 is disconnected to the drive wheels 62. At 428 control calculates a desired speed of the second electric motor 24. The desired speed of the second electric motor 24 can be calculated using wheel speeds (such as using input from sensors 110 and the drive wheels 62) using ratio of the desired disconnect element state, final drive ratio and ratio from the second electric motor 24 to transmission output. The speed ensures speed matching on both sides of the disconnect element 40. Speed control of the second electric motor 24 is enabled.

At 430, control targets a desired speed of the second electric motor 24. The desired speed of the second electric motor 24 is targeted by applying additional closed loop torque to the second electric motor 24. Additional torque is further applied to the first electric motor 22 to avoid a change of speed of the ICE 20 caused by the change of speed of the second electric motor 24. At 440, control determines whether the disconnect element 40 has reconnected to the powertrain 14 to the drive wheels 62. If not, control loops to 430. If the disconnect element 40 has reconnected to the powertrain 14, speed control for the second electric motor 24 is deactivated. Control ends at 450.

Figure 5:
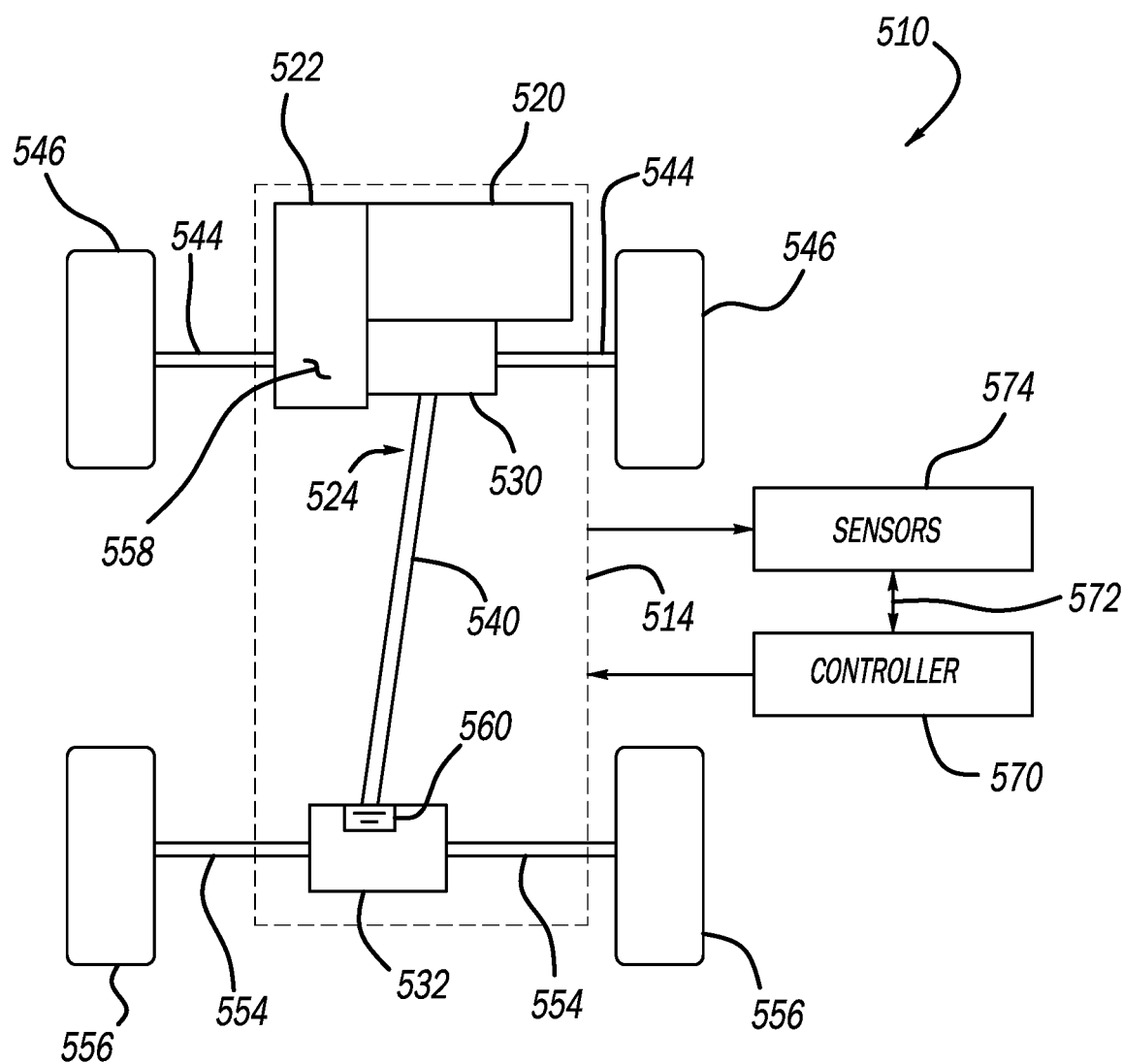
FIG. 5 is a functional block diagram of a vehicle incorporating a 4WD shift system for a 4WD vehicle according to additional features of the present application.
Figure 6:
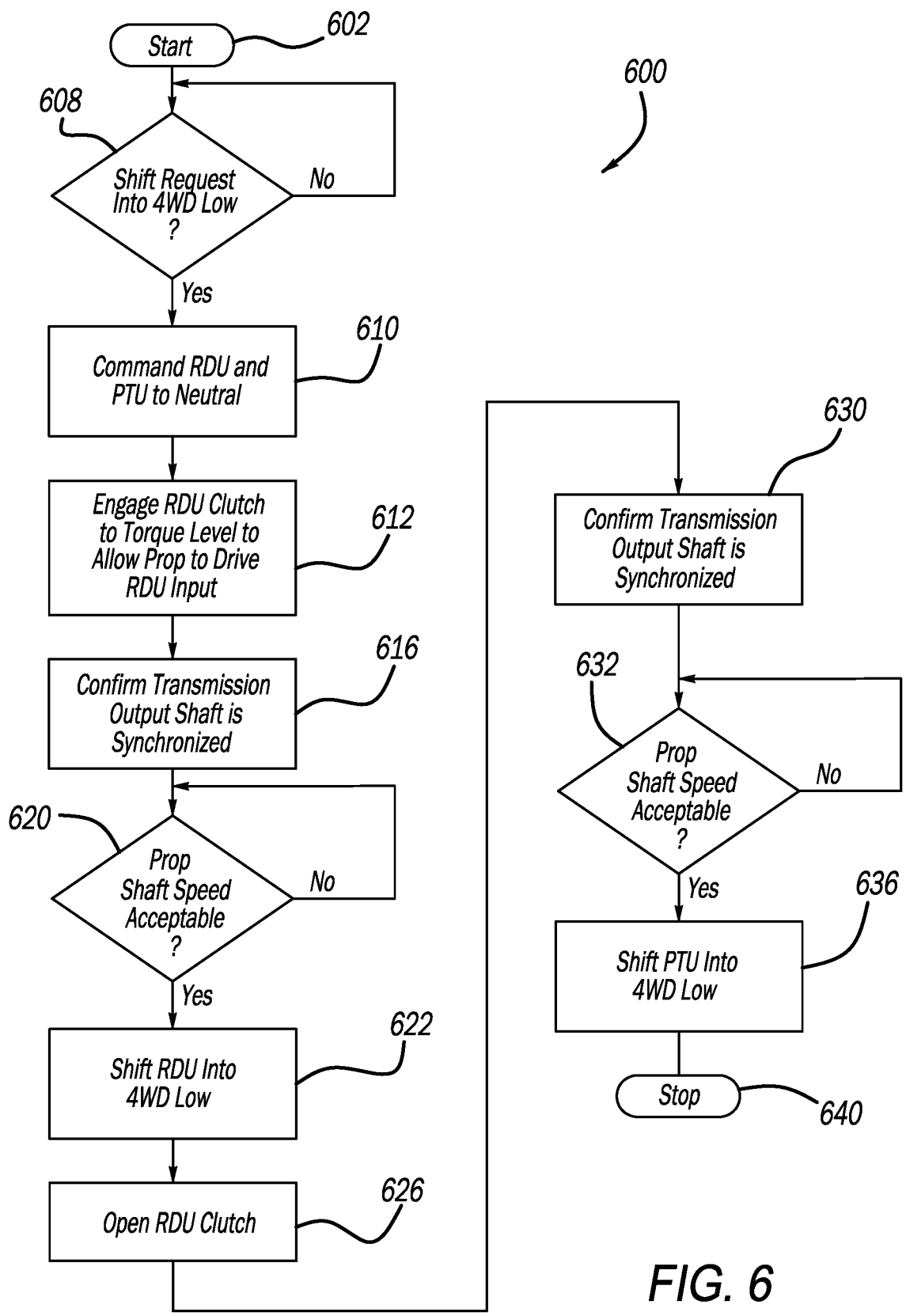
FIG. 6 is an exemplary flow diagram showing steps for shifting the 4WD system of FIG. 5 into 4WD low range while the vehicle is in motion.

Turning now to FIGS. 5 and 6, a method of controlling a 4WD system for shifting into a 4WD low range while the vehicle is in motion will be described. A functional block diagram of an example vehicle 510 according to additional features of the present application is illustrated. The vehicle 510 includes a powertrain 514 including an ICE 520 and a transmission 522. The ICE 520 and transmission 522 cooperate to provide drive torque to a driveline 524 including a PTU 530, an RDU 532, a propeller (prop) shaft 540, front drive shafts 544 that selectively drive front drive wheels 546 and rear drive shafts 554 that selectively drive rear drive wheels 556. The PTU is directly connected to an output shaft 558 of the transmission 522 interrupting to one of the front drive shafts 544. The PTU is rotatably coupled to the RDU by way of the prop shaft 540. The RDU 532 is thereafter rotatably coupled to the rear drive wheels 556 through the rear drive shafts 554. As described herein, a 4WD low range shift requires gear reduction to take place in both of the PTU 530 and the RDU 532.

The cause of issue during a 4WD low range shift on a vehicle is motion is the sudden change of gear ratio between the transmission output shaft 558 and the wheels 546, 556 that takes place in the PTU 530 and the RDU 532. As this type of shift is made, the 4WD low range gear set (within the PTU 530 and RDU 532) is forced to rotate at the velocity of the wheels 546, 556 since they are directly connected. The input to the 4WD low range gear set is greater than the wheel speeds by exactly the low range gear ratio. The transmission output shaft 558 will rotate at whatever speed is dictated by the internal working of the transmission 522 but would typically be rotating at whatever the original wheel revolutions per minute (RPM) was prior to the initiation of the 4WD low range shift event. As the driveline completes the connection between the transmission output and the 4WD low range gear set, the two different speed shafts (transmission output shaft 558 and 4WD low range gear set) are suddenly brought together which, depending on the magnitude of the difference either creates a noise vibration and harshness (NVH) concern or damage to the powertrain.

The control strategy of the instant disclosure aims to solve this challenge. The control strategy actively manages the speed of the transmission output shaft 558 for the purpose of matching the input speed to the 4WD low range system at the PTU 530 and RDU 532. This control strategy provides a significantly expanded vehicle operating speed range for shifts into and out of 4WD low range. The vehicle operator will no longer be required to stop (or operate at very low speeds) in order to shift to 4WD low range.

A clutch 560 selectively engages to transmit some, all or none of the drive torque from the prop shaft 540 into the RDU 532 and therefore the rear drive shafts 554. The clutch 560 provides a means to disconnect the torque flow from the prop shaft 540 into the RDU 532 allowing the rear drive wheels 556 to be isolated from the drive torque flowing through the driveline 524. A controller 570 receives inputs 572 from sensors 574 including wheel sensors to selectively apply the clutch 560 with varying amounts of torque in order to send some of the drive torque to the rear drive wheels 556 which helps control the slip of the front drive wheels 546.

With additional reference now to FIG. 6, a control method for synchronizing a 4WD low range shifting while the vehicle 510 is in motion will be described. In general, transmission synchronization speed is a product of a low range gear ratio and an average axle wheel speed (herein "transmission synchronization equation"). The transmission synchronization speed is the target speed for the transmission output shaft 558. The low range gear ratio is a numeric ratio for the low range planetary gear reduction unit. By way of example only, a low range gear ratio for this disclosure is 2.92. It is appreciated that other ratios may be used. The average axle wheel speed is the average of the two wheel speeds for the axle being synchronized. For example, during front axle synchronization, the speeds of the front wheels 546 for the PTU 530 provided by wheels sensors of the sensors 574 are communicated to the controller 570 and an average is calculated. Similarly, during rear axle synchronization, the speeds of the rear wheels 556 for the RDU 532 provided by wheels sensors of the sensors 574 are communicated to the controller 570 and an average is calculated.

The control method for synchronizing a 4WD low range shifting while the vehicle 510 is in motion is shown and generally identified at reference numeral 600. Control starts at 602. At 608, control determines whether a shift request has been made into 4WD low from 4WD high. If no shift request has been made, control loops to 608. If control determines that a 4WD low shift request has been made, control commands the RDU 532 and the PTU 530 to a disconnected or neutral position. With the RDU 532 and PTU in a neutral position, any rotation of the transmission output shaft 558 is not connected to and therefore not inadvertently translated to the drive wheels 546, 556. Next, the RDU 532 is shifted into a desired position. In particular, at 612, the clutch 560 at the RDU 532 is engaged to a torque level to allow the prop shaft 540 to drive the RDU 532. Again, the clutch 560 can move between a fully open position wherein no rotation of the prop shaft 540 is communicated through the RDU 532 and various levels of engaged to transmit a corresponding level of rotation through the RDU 532. Torque is built up in the RDU 532 so that when the transmission output shaft 558 speeds up, the clutch 560 can send that speed into the RDU 532. At 616 the output shaft 558 of the transmission 522 is spun up or synchronized to match the speed in the RDU 532. Again, the transmission output shaft 558 will need to speed up to a multiple of the low range RDU (in this example, 2.92).

At 620, control determines whether the speed of the prop shaft 540 is acceptable. The speed of the prop shaft 540 is measured by sensors 574. Once the speed is in an acceptable range, such as determined by the transmission synchronization equation, the RDU 532 is shifted into 4WD low range at 622. Because the speed of the prop shaft 540 is in the acceptable range (in this example, 2.92 times the speed of the wheels 556), the shifting of the RDU 532 occurs without mismatched gear timing and undesired harshness. If the speed of the prop shaft 540 is not acceptable, control loops to 620.

At this point, only the rear drive wheels 556 are handled. Now, the front drive wheels 546 need to be addressed at the PTU 530. Next, the RDU clutch 560 is opened at 626. The RDU clutch 560 is opened such that no interference is directed back through the prop shaft 540 and into the PTU 530. At 630 the output shaft 558 of the transmission 522 is spun up or synchronized to match the speed in the PTU 530. Again, the transmission output shaft 558 will need to speed up to a multiple of the low range PTU (in this example, 2.92). At 632 control determines whether the speed of the prop shaft 540 is acceptable. Again, the speed of the prop shaft 540 can be measured using a prop shaft speed sensor of the sensors 574. Once the speed is in an acceptable range, such as determined by the transmission synchronization equation, the PTU 530 is shifted into 4WD low range at 636. Because the speed of the prop shaft 540 is in the acceptable range (in this example, 2.92 times the speed of the wheels 546), the shifting of the PTU 530 occurs without mismatched gear timing and undesired harshness. If the speed of the prop shaft 540 is not acceptable, control loops to 632. In some examples, the sequence of steps set forth in the method 600 can all occur very fast (such as less than a second), making it seamless to a vehicle operator. Control ends at 640.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A method of controlling a four wheel drive (4WD) low range shift in a vehicle, the vehicle having a powertrain including a transmission that drives a transmission output shaft to provide drive torque to a driveline including a power transfer unit (PTU) that delivers torque to front drive wheels and a rear differential unit (RDU) that delivers torque to rear drive wheels, the PTU and RDU selectively rotatably coupled to each other through a propeller (prop) shaft, the method comprising:

commanding the PTU and the RDU into a neutral position based on a determination that a 4WD low range shift request has been made;

commanding a clutch at the RDU to selectively engage to a degree that communicates a desired amount of torque from the prop shaft to the RDU;

determining that an output speed of the transmission output shaft is synchronized to match a speed of the RDU;

determining a first speed of the prop shaft;

commanding the RDU to shift into 4WD low based on a determination that the prop shaft first speed satisfies a desired first speed;

commanding the clutch at the RDU to open;

determining the output speed of the transmission output shaft is synchronized to match a speed of the PTU;

determining a second speed of the prop shaft; and commanding the PTU to shift into 4WD low based on a determination that the prop shaft second speed satisfies a desired second speed.

2. The method of claim 1, wherein determining that output speed of the transmission output shaft is synchronized to match the speed of the RDU comprises:

determining whether the speed of the transmission output shaft is elevated to match a corresponding speed expected at rear drive shafts driven by the RDU based on a gear reduction occurring into the 4WD low range shift.

3. The method of claim 1, wherein determining that output speed of the transmission output shaft is synchronized to match the speed of the PTU comprises:

determining whether the speed of the transmission output shaft is elevated to match a corresponding speed expected at front drive shafts driven by the PTU based on a gear reduction occurring into the 4WD low range shift.

4. The method of claim 1, wherein determining the first speed of the prop shaft comprises:

receiving a prop shaft first speed signal from a prop shaft speed sensor.

5. The method of claim 1, wherein determining the second speed of the prop shaft comprises:

receiving a prop shaft second speed signal from a prop shaft speed sensor.

6. The method of claim 1, wherein determining that the output speed of the transmission output shaft is synchronized to match the speed of the RDU comprises:

determining an average axle wheel speed of rear drive axles driven by the RDU;

determining a low range gear ratio provided by the RDU;

calculating a product of the average axle wheel speed and the low range gear ratio; and comparing the product with the transmission output shaft speed.

7. The method of claim 6, wherein determining the average axle wheel speed of the rear drive axles includes:

receiving a first wheel speed from a first rear drive wheel;

receiving a second wheel speed from a second rear drive wheel; and averaging the first and second wheel speeds.

8. The method of claim 6, wherein the low range gear ratio is 2.92.

9. The method of claim 1, wherein determining that the output speed of the transmission output shaft is synchronized to match the speed of the PTU comprises:

determining an average axle wheel speed of front drive axles driven by the PTU;

determining a low range gear ratio provided by the PTU;

calculating a product of the average axle wheel speed and the low range gear ratio; and comparing the product with the transmission output shaft speed.

10. The method of claim 9, wherein determining the average axle wheel speed of the front drive axles includes:

receiving a first wheel speed from a first front drive wheel;

receiving a second wheel speed from a second front drive wheel; and averaging the first and second wheel speeds.

* * * * *